Figure 1:
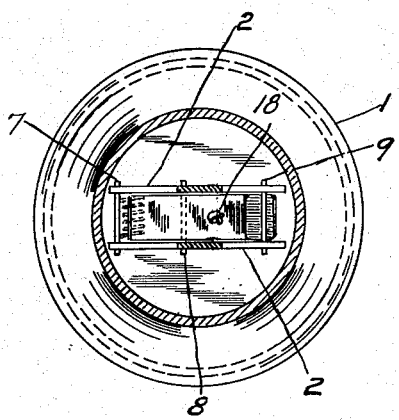

May 29, 1956 R. G. BLASKOW 2,747,317
DEVICE FOR AUTOMATICALLY HOOKING FISH
Filed July 10, 1952

Roman G Blaskow
INVENTOR.

BY Chas. Senegre
Attorney.

United States Patent Office 2,747,317
Patented May 29, 1956

2,747,317

DEVICE FOR AUTOMATICALLY HOOKING FISH

Roman G. Blaskow, Birmingham, Ala.

Application July 10, 1952, Serial No. 298,030

2 Claims. (Cl. 43—15)

This invention relates to a device for automatically hooking fish. It has for its main objects to provide such a device that will be highly satisfactory for the purpose intended, simple in structure, cheap to manufacture, easy to use, and extremely durable.

Other objects and advantages will appear from the drawing and specification.

Figure 4:
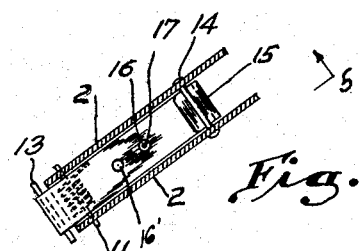
Figure 5:
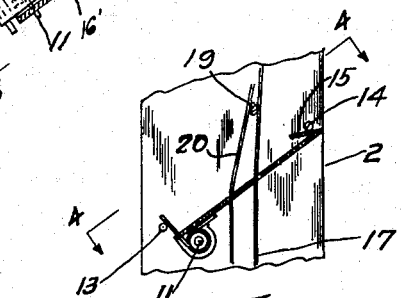
Figure 2:
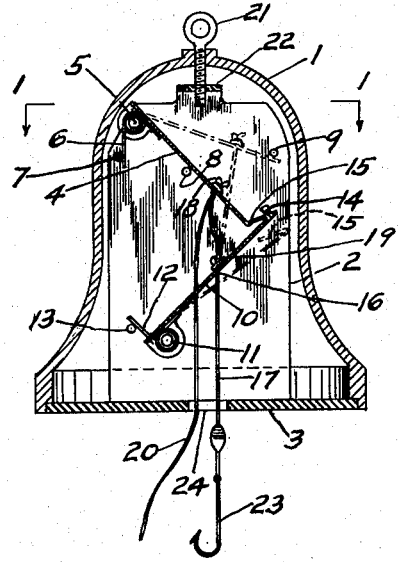
Figure 3:
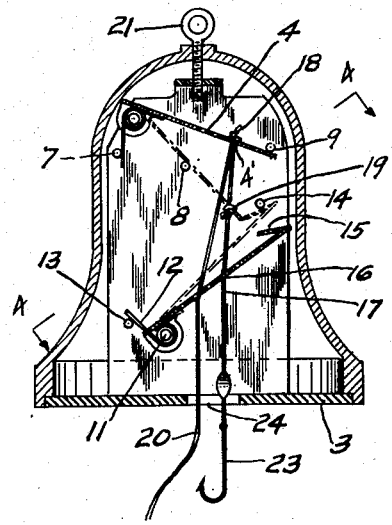

By referring generally to the drawing, a part of this application, it will be observed that Fig. 1 is a sectional view on line 1—1 of Fig. 2 showing the top of the mechanism supporting frame in the bell-shaped case; Fig. 2 is a sectional view showing the trigger set for use; Fig. 3 is a sectional view showing the trigger released; Fig. 4 is a view on line 4—4 of Figs. 3 and 5; and Fig. 5 is a view on line 5—5 of Fig. 4. In Figs. 2, 3 and 5 one wall of the supporting frame is removed.

Similar reference numerals refer to similar parts throughout the several views.

Referring to the drawing in detail, it will be seen that the device comprises a bell-shaped case 1 with a frame 2 attached to a bottom plate 3. The frame may have one wall as shown in Figs. 2, 3 and 5, or two walls as shown in Figs. 1 and 4. A lever arm 4 is mounted swingable on pin 5 supported in the frame and under tension of a coil spring 6 also supported on pin 5 with an end of the spring held against pin 7. Pins 8 and 9 act as stops for the lever arm 4. A trigger arm 10 is mounted swingable on pin 11 and under tension a coil spring 12 is held in tension by pin 13. Pin 14 acts as a stop for trigger arm 10 which is provided with a V-shaped end 15 adapted to hold set the free end of arm 4, as seen in Figure 2. The trigger arm 10 has a hole 16 through which a hook line 17 is inserted with the upper end of the line attached to lever arm 4 through hole 4' by a knot 18. A knot 19 is formed on the hook line and is of a size to prevent it from passing through the hole 16 in the trigger arm. A line 20, passing through hole 16' in trigger arm 10, is provided for setting the free end of the lever arm 4 by pulling it downward under the V-shaped end 15 of the trigger arm to thus set the mechanism for use. A screw-eye 21 is mounted in the top of the bell-shaped case and screws into the integral top portion 22 of the supporting frame 2. The hook line is provided with a regular fish hook 23. The bottom plate 3 is provided with a comparatively large hole 24 through which the hook line and setting line are passed.

From the foregoing it will appear that in order to use the device it is first necessary to place bait upon the hook, then pull the setting line downward till the free end of the lever arm becomes engaged under the tip of the V-shaped end of the trigger arm. When in this condition the knot 19 in the hook line is positioned adjacent the hole 16 in the trigger arm and a pull by a fish will release the lever arm thereby causing it to jerk the hook upward.

The entire device is supported by a line (not shown) attached to the screw-eye in the top.

The device may be made of any material suitable for the purpose. Also it may be made in different sizes and capacities depending on what size fish are sought.

While I have shown and described the preferred embodiment of my invention, I do not wish to limit same to the exact and precise details of structure, but reserve the right to make all modifications and changes so long as they remain within the scope of the invention and the following claims.

Having described my invention I claim:

1. An automatic device of the character described for hooking fish comprising a case shaped substantially like an ordinary bell, a screw-eye, a frame removably supported in said case by means of said screw-eye extending through the top of the case and into a portion of the top of the frame, said horizontal pin mounted in the upper portion of said frame, a lever arm attached pivotally by one end on said pin, a coil spring mounted on said pin and set to urge the free end of the lever arm toward the top of said frame, a lever setting line, a fishhook line, two additional pins attached in the frame for limiting the movement space of said lever arm, the said lever arm being provided with a centrally disposed hole through which is passed said lever setting line and said fishhook line, and the said lines being secured to the lever arm above the hole; a trigger arm, a pin attached in the lower portion of said frame, said trigger arm attached pivotally by one end thereof on said last-mentioned pin in the lower portion of the frame, a coil spring mounted on the trigger arm pin, said last-mentioned spring set to urge the free end of the trigger arm toward the top of the frame, and a pin attached in the frame at a position to make contact with the free end of the trigger arm, the trigger arm having a V-shaped end adapted by manual means to make contact with the free end of the lever arm, the trigger arm being provided with two holes, one to permit passage of the fishhook line, the other passage of the setting line, and the fishhook line being provided with a knot designed to engage and release the trigger arm when a downward pull occurs on the said fishhook line.

2. A device of the character described for automatically hooking fish comprising an ordinary bell-shaped case, a frame supported in said case, a swingable lever arm supported in said frame, a spring attached to said lever arm adapted to urge the free end of said lever arm toward the top of the case; a trigger arm supported in said frame, said trigger arm being mounted for swinging movement on the frame, a coil spring attached to said trigger arm, said last-mentioned spring being set to urge the free end of said trigger arm toward the top of the case, pins mounted in said frame for controlling the space movements of said lever arm and trigger arm, a fishing line and a trigger setting line attached to said lever arm, the trigger arm being provided with two holes through which the fishhook line and setting line may be trained, said trigger arm having a V-shaped end, the free end of said lever arm being adapted by pulling on the setting line to fit removably against the V-shaped end of the trigger arm; and a screw-eye attached in the top of said case; said fishing line having a knot above the trigger arm as means for releasing the trigger arm when pulled or jerked by a fish.

References Cited in the file of this patent

UNITED STATES PATENTS

| | | |
|---|---|---|
| 1,989,407 | Ezell | Jan. 29, 1935 |
| 1,996,704 | Hawkinson | Apr. 2, 1935 |